(12) United States Patent
Campos et al.

(10) Patent No.: US 11,836,298 B2
(45) Date of Patent: Dec. 5, 2023

(54) KEYBOARD DEVICE TO SWITCH BETWEEN OPERATING SYSTEM MODES

(71) Applicant: Hewlett-Packard Development Company, L.P., Spring, TX (US)

(72) Inventors: Mario E. Campos, Spring, TX (US); Richard K. Hohmann, II, Chelmsford, MA (US); Ron Y. Zhang, Fort Collins, CO (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/414,340

(22) PCT Filed: Jun. 28, 2019

(86) PCT No.: PCT/US2019/039935
§ 371 (c)(1),
(2) Date: Jun. 16, 2021

(87) PCT Pub. No.: WO2020/263281
PCT Pub. Date: Dec. 30, 2020

(65) Prior Publication Data
US 2022/0107692 A1    Apr. 7, 2022

(51) Int. Cl.
*G06F 3/02* (2006.01)
*G06F 3/01* (2006.01)

(52) U.S. Cl.
CPC .............. *G06F 3/0219* (2013.01); *G06F 3/01* (2013.01); *G06F 3/02* (2013.01)

(58) Field of Classification Search
CPC . G06F 3/0219; G06F 3/01; G06F 3/02; G06F 3/023; G06F 3/0202; G06F 3/0238
See application file for complete search history.

(56) References Cited

U.S. PATENT DOCUMENTS

| | | |
|---|---|---|
| 5,408,060 A | 4/1995 | Muurinen |
| 8,756,354 B2 | 6/2014 | Chao |
| 8,901,405 B1 | 12/2014 | McCarthy |
| 9,224,555 B2 | 12/2015 | Lee |
| 2005/0078090 A1 | 4/2005 | Glatzer et al. |
| 2008/0294887 A1 | 11/2008 | Wang |
| 2009/0179859 A1 | 7/2009 | Wisebourt et al. |
| 2012/0249344 A1 | 10/2012 | Chou |
| 2016/0062923 A1* | 3/2016 | Holzbecher ........... G06F 13/102 710/63 |
| 2016/0259427 A1* | 9/2016 | Zheng ................... G06F 3/0202 |
| 2017/0003754 A1 | 1/2017 | Geary et al. |
| 2018/0053611 A1 | 2/2018 | Yang et al. |

OTHER PUBLICATIONS

How to Use a Windows PC Keyboard on Mac by Remapping Command & Option Keys, Jan. 31, 2018_OSXdaily, 7 pages.

* cited by examiner

*Primary Examiner* — Adam R. Giesy
(74) *Attorney, Agent, or Firm* — Knobbe, Martens, Olson & Bear, LLP

(57) ABSTRACT

Examples of a keyboard device to switch between operating system (OS) modes are described herein. In some examples, the keyboard device may include a key that includes a lighting element that switches between lighting modes based on a selected OS mode. The lighting mode may indicate the selected OS mode.

17 Claims, 5 Drawing Sheets

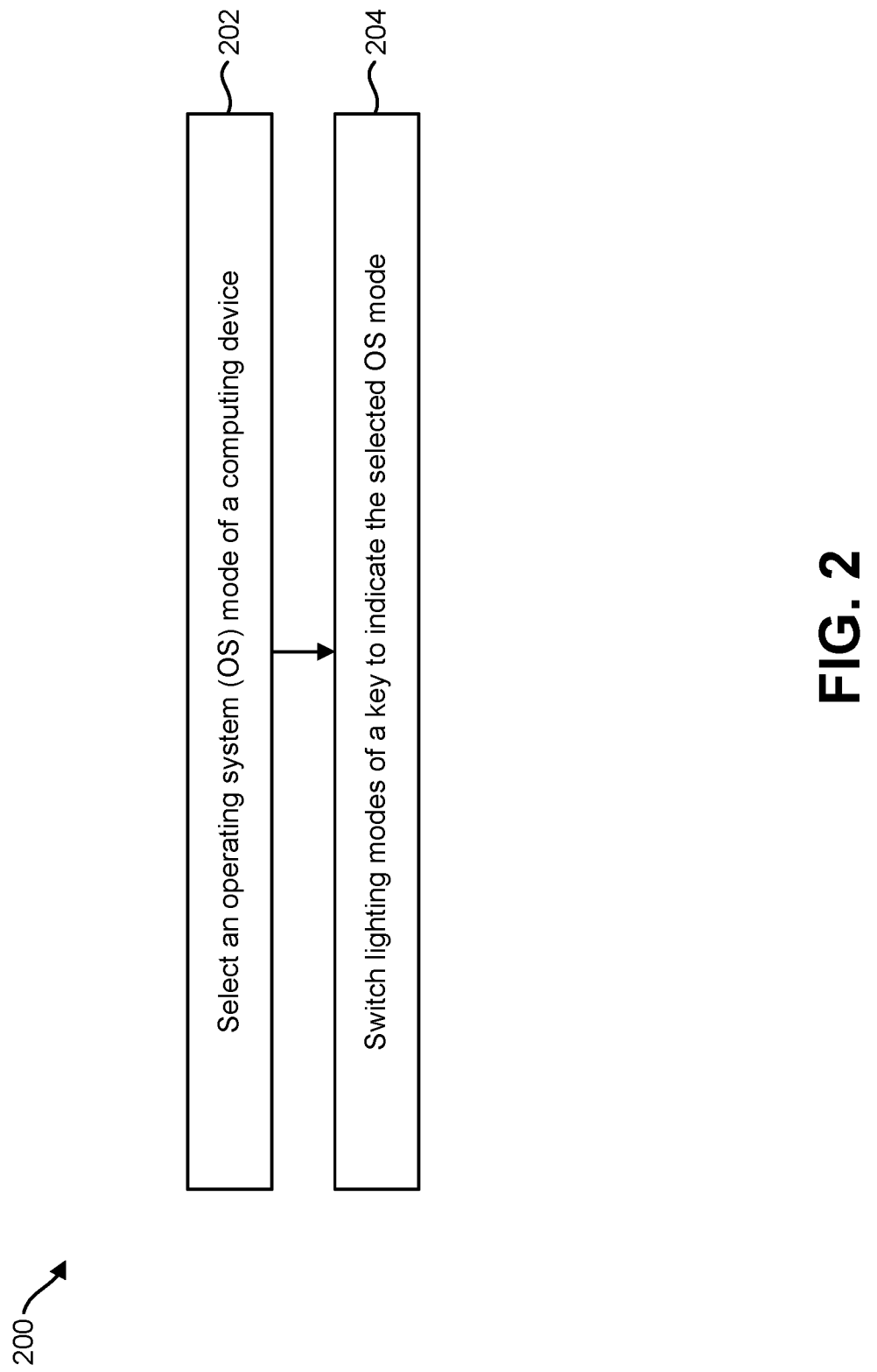

KEYBOARD DEVICE TO SWITCH BETWEEN OPERATING SYSTEM MODES

BACKGROUND

A keyboard device provides a user of a computing device the ability to interact with the computing device. The keyboard device may include keys that a user presses to provide information to the computing device.

BRIEF DESCRIPTION OF THE DRAWINGS

Various examples will be described below by referring to the following figures.

FIG. 2 is an example flow diagram illustrating a method for switching between OS modes for a keyboard device;

Figure 1:
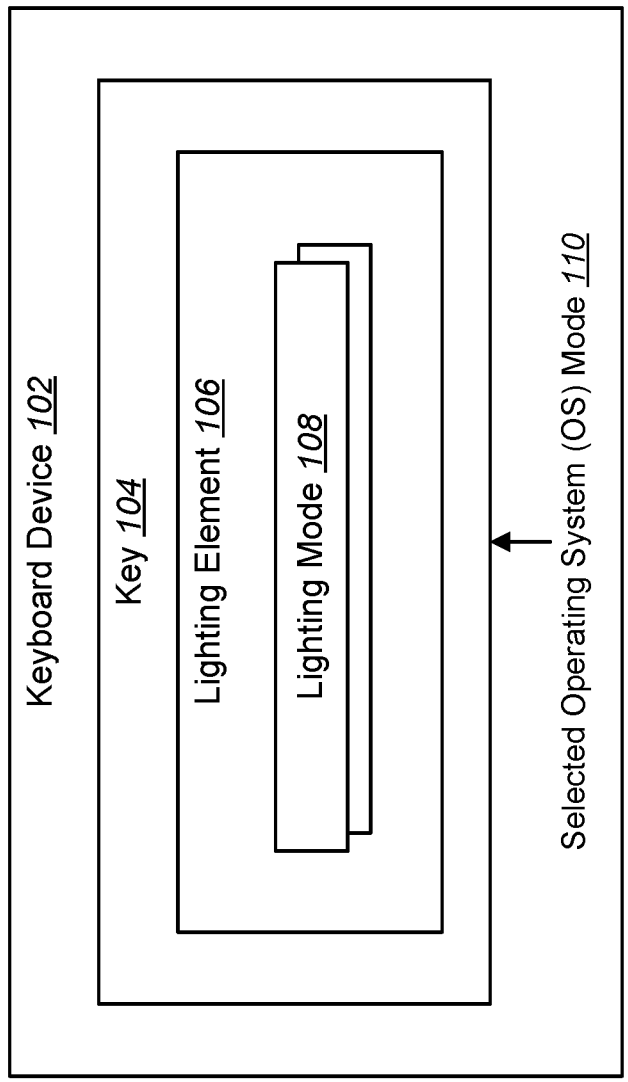
FIG. 1 is a block diagram illustrating an example of a keyboard device that switches lighting modes based on a selected operating system (OS) mode.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

DETAILED DESCRIPTION

Examples of a keyboard device with a key that changes lighting modes based on a selected operating system (OS) mode are described. The lighting modes may provide instant feedback of key functionality for a selected OS mode. Examples of automatic keyboard remapping based on the selected OS mode are also described. The automatic keyboard remapping may enable a user to easily switch between different keyboard layouts as the user switches between different OS modes.

FIG. 1 is a block diagram illustrating an example of a keyboard device 102 that switches lighting modes 108 based on a selected operating system (OS) mode 110. Examples of the keyboard device 102 include alphanumeric keyboards for a computing device (e.g., laptop and/or desktop computer). Other examples of the keyboard device 102 include keypads that may be used with a computing device. The keyboard device 102 may communicate with the computing device via a wired (e.g., corded) connection or a wireless connection.

The keyboard device 102 may include a key 104. In some examples, the keyboard device 102 may include multiple keys 104. A key 104 may be a physical switch to enable a user to provide input to a computing device. In some examples, the key 104 may be a mechanical or electronic switch. The key 104 may also be referred to as a button.

The key 104 may provide information to the computing device when pressed. For example, the key 104 may provide text (e.g., letter or number) information. In other examples, the key 104 may be a cursor key (e.g., up, down, left, right), a system command key (e.g., print screen, pause, break), an escape key (e.g., Esc), a backspace, an enter key or a shift key.

In other examples, the key 104 may be a modifier key (also referred to as a shortcut key). For example, the key 104 may modify the action of another key when the two keys are pressed in combination. The type of modifier key used by a keyboard device 102 may vary based on the operating system (OS) used by the computing device. In one example, MICROSOFT WINDOWS may use control (e.g., ctrl), function (e.g., fn), WINDOWS (e.g., win), and/or alternate (e.g., alt) modifier keys to perform commands in the WINDOWS OS. For instance, a copy operation in WINDOWS may be performed by pressing ctrl and "C" (referred to as ctrl+C). In another example, APPLE MAC OS may use command (e.g., cmd), option (e.g., opt), control and/or function (e.g., fn) modifier keys. For instance a copy operation in MAC OS may be performed by pressing cmd and "C" (referred to as cmd+C).

It should be noted that for default keyboard mappings, the modifier keys may differ in location from one OS to another OS. For example, the ctrl key in WINDOWS is not the same as key as the cmd key in MAC OS. Examples of keyboard mappings are described in FIG. 4.

In an example, a computing device may have a single installed OS. In other examples, a computing device may have multiple operating systems (OSs) installed on the same computing device. For instance, a computing device may have WINDOWS and MAC OS installed. In yet other examples, the computing device may have a single OS, but may interact remotely with another OS. For instance, a computing device with WINDOWS may establish a connection with a remote computing device running a different operating system (e.g., MAC OS, UNIX, LINUX, etc.). In another example, a computing device may run multiple operating systems in as a virtual machine.

In some scenarios, when a user migrates from a first OS to a second OS, the user may be unfamiliar with the layout of the keyboard in the second OS. A number of key commands, functions, and modifier keys may be swapped due to the difference between the operating systems. The keyboard device 102 described herein may help a user transition from a first OS to a second OS by switching a lighting mode 108 associated with a selected OS mode 110.

The key 104 may include a lighting element 106 that switches between lighting modes 108 based on a selected OS mode 110 to indicate the selected OS mode 110. As used herein, an OS mode is a mode of operation for the keyboard device 102 corresponding to a particular OS. The OS mode corresponds to a key mapping associated with an operating system. For instance, in a first OS mode (e.g., WINDOWS mode), the key 104 may operate according to the keyboard layout of the first OS (e.g., WINDOWS). In a second OS mode (e.g., MAC OS mode), the key 104 may operate according to the keyboard layout of the second OS (e.g., MAC OS).

In some examples, a user may select the OS mode 110. For example, a user may toggle between a first OS mode and a second OS mode. In some examples, the keyboard device 102, the computing device or both may include a user interface (e.g., button, switch, slider, etc.) to toggle (e.g., switch) between the OS modes. In some examples, the user interface may be included as an element in a graphical user interface (GUI) displayed on the computing device. An example of a GUI to toggle between OS modes is described in FIG. 5.

The lighting mode 108 of the key 104 may indicate the selected OS mode 110. For example, the lighting element 106 may illuminate different lights to indicate the selected OS mode 110. In some examples, the lighting element 106 may include multiple lights where one light is associated with a given OS mode. For example, a first light may be associated with a first OS mode, a second light may be associated with a second OS mode, a third light may be associated with a third OS mode, and so forth. A light associated with a selected OS mode may be illuminated and the other lights may be turned off.

It should be noted that in some examples, the computing device may operate in more than two OS modes. For example, the computing device may include multiple (e.g., more than two) operating systems. In other examples, the computing device may interact (e.g., communicate) with multiple operating systems. In yet other examples, the computing device may operate in different OS modes during basic input/output system (BIOS) operation as compared to operating in an operating system.

In an implementation, the lighting element 106 may include two lights (e.g., light emitting diodes (LEDs)). In a first lighting mode 108 corresponding to a first selected OS mode 110, the lighting element 106 may illuminate a first light in response to the first OS mode being selected. In a second lighting mode 108 corresponding to a second selected OS mode 110, the lighting element 106 may illuminate a second light in response to the second OS mode being selected In some examples, the lighting element 106 may be included within the key 104. For example, two lights may be under the keycap of the key 104. The lights may be visible through an aperture on the keycap. In other examples, the lighting element 106 may be visible along the perimeter of the key 104. For instance, the lighting element 106 may illuminate the edge of the key 104 or the area surrounding the key 104. In yet other examples, the lighting element 106 may be separate from the key 104 and the light may be conveyed to the key via a light guide or light channel.

In some examples, the lighting mode 108 may include a color that indicates the selected OS mode 110. Different light colors of the lighting element 106 may indicate the selected OS mode 110. For example, a first color (e.g., blue) may indicate selection of the first OS mode and a second color (e.g., green) may indicate selection of the second OS mode. In some implementations, the colors used to indicate the selected OS mode 110 may be configurable by the user. For instance, the lighting element 106 may include red-green-blue (RGB) LEDs. A user may select the colors for the different OS modes. In other implementations, the color for the selected OS mode 110 may be fixed based on the color of the light used.

In some examples, the lighting mode 108 may include a light placement indicating the selected OS mode 110. For instance, a light corresponding to the first OS mode may be located in a first region of the key 104 and a light corresponding to the second OS mode may be located in a second region of the key 104. Therefore, different portions of the key 104 may illuminate during a different OS mode to indicate the selected OS mode 110. In an implementation, the light corresponding to the first OS mode may be located in the top right corner of the key 104 and a light corresponding to the second OS mode may be located in the bottom left corner of the key 104. An example light placement is described in FIG. 3. It should be noted that other light placement schemes may be used in other examples.

In some examples, the lighting element 106 may illuminate a first symbol on the key 104 for a first OS mode and the lighting element 106 illuminates a second symbol on the key 104 for a second OS mode. The symbol may also be referred to as a keyboard key label. The symbol may be text (e.g., letter(s) and/or number(s)) or other visual information (e.g., the WINDOWS symbol).

The symbols may be located on different portions of the keycap as described above. The symbol may permit light passage. For example, a first light located under the keycap may illuminate the first symbol and the light from first light may be visible to a user of the keyboard device 102 when the first OS mode is selected. A second light located under the keycap may illuminate the second symbol and the light from second light is visible to a user of the keyboard device 102 when the second OS mode is selected. The symbols may be created via printing, etching and/or molding of the key 104. Examples of symbols that may be used for switching between OS modes are described in FIG. 4.

In some examples, the key 104 may be remapped from a default mapping of a first operating system to a modified mapping of a second operating system in response to switching between OS modes. For example, a user of MAC OS may be familiar with the key combinations to perform a copy operation (e.g., cmd+C). However, if the user is using WINDOWS with a default keyboard layout, the same key combination will not result in the copy operation. These keyboard layout inconsistencies may create usability difficulties (e.g., due to ergonomics and layout) whenever a user switches between different OS environments.

To facilitate the use of different operating systems, the key 104 may be automatically remapped when switching between selected OS modes 110. For example, when in a WINDOWS mode, the keyboard layout may be the default WINDOWS layout. However, when MAC OS mode is selected, the functionality of the modifier keys may be mapped to the corresponding WINDOWS functionality. For instance, while using WINDOWS, the user may select MAC OS mode. The "cmd" key in MAC OS mode may be mapped to "ctrl" of the WINDOWS OS. Therefore, a user who is accustomed to a MAC OS keyboard layout may use WINDOWS without relearning key combinations to perform various commands and shortcuts. An example of keyboard remapping is described in FIG. 4.

In some examples, the lighting mode 108 may switch to indicate the mapping of the key 104 based on the selected OS mode 110. For example, the lights and/or color may switch based on which OS mode 110 is selected. A first lighting mode 108 for a first selected OS mode 110 may correspond to a first key mapping. A second lighting mode 108 for a second selected OS mode 110 may correspond to a second key mapping.

Switching between lighting modes 108 may allow a user of the keyboard device 102 to know instantly which OS mode they are in and identify the familiar key combination they desire to press, as examples. The described keyboard device 102 may provide a user a smooth transition from one OS to another OS. Whenever the user is dealing with multiple operating systems (e.g., physical or virtual machines), an expected key mapping may be detected by the host OS and keyboard input may be transcribed accordingly. A user may easily transition between these operating systems. A user may also use a single keyboard device 102 so the user does not switch between different muscle memories or physical keyboards for different operating systems.

FIG. 2 is an example flow diagram illustrating a method 200 for switching between operating system (OS) modes for a keyboard device 102. The method 200 may be implemented by a computing device in communication with the keyboard device 102.

The computing device may select 202 an OS mode. For example, the computing device may toggle between two OS modes. In such examples, the toggling may be performed based on system operations, such as application execution, or based on user interaction. In some examples, the computing device may include a user interface to toggle between OS modes. The computing device may receive a user input for a selected OS mode 110. A first OS mode is a mode of operation for the keyboard device 102 corresponding to a first OS. A second OS mode is a mode of operation for the keyboard device 102 corresponding to a second OS.

The computing device may switch 204 lighting modes 108 of a key 104 to indicate the selected OS mode 110. In some examples, the key 104 may be a modifier key of the computing device. The key 104 may include a lighting element 106. The lighting element 106 may include multiple lights where a given light is associated with a certain OS mode. In some examples, the lighting element 106 may include two lights. A first light may illuminate in response to a first selected OS mode and a second light may illuminate in response to a second selected OS mode. The light placement may indicate the selected OS mode 110. For example, different portions of the key 104 may illuminate during different OS modes to indicate the selected OS mode 110.

In some examples, different light colors of the lighting element 106 may indicate the selected OS mode 110. In another example, the light color may not be different, but the key 104 may be illuminated in different areas to indicate the selected OS mode 110.

In another example, the selected OS mode 110 may be indicated by varying the luminance of the light. The luminance (e.g., brightness) of a single light or multiple lights on a key 104 may indicate the selected OS mode 110. For example, a high luminance level may indicate a first OS mode and a low luminance level (e.g., the light may be dim or off) may indicate a second OS mode.

In some examples, switching lighting modes 108 of the key 104 may include illuminating a first symbol on the key 104 for a first OS mode and illuminating a second symbol on the key 104 for a second OS mode. For example, a first light may illuminate the first symbol when the first OS mode is selected. A second light may illuminate the second symbol when the second OS mode is selected.

In an example, the computing device may send a signal to a lighting controller of the key 104 based on the selected OS mode 110. For example, when a first OS mode is selected, the computing device may send a signal to the lighting controller instructing the lighting controller to use a first lighting mode 108. When a second OS mode is selected, the computing device may send a signal to the lighting controller instructing the lighting controller to use a second lighting mode 108.

Figure 3B:
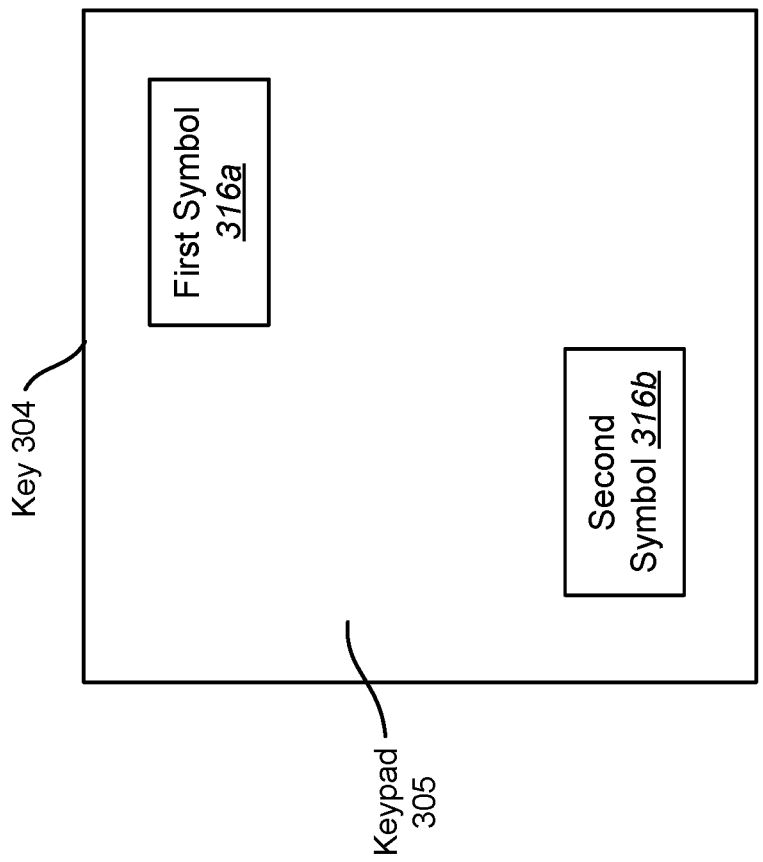
FIGS. 3A and 3B are examples illustrating light placement on a key to indicate a selected OS mode.
Figure 3A:
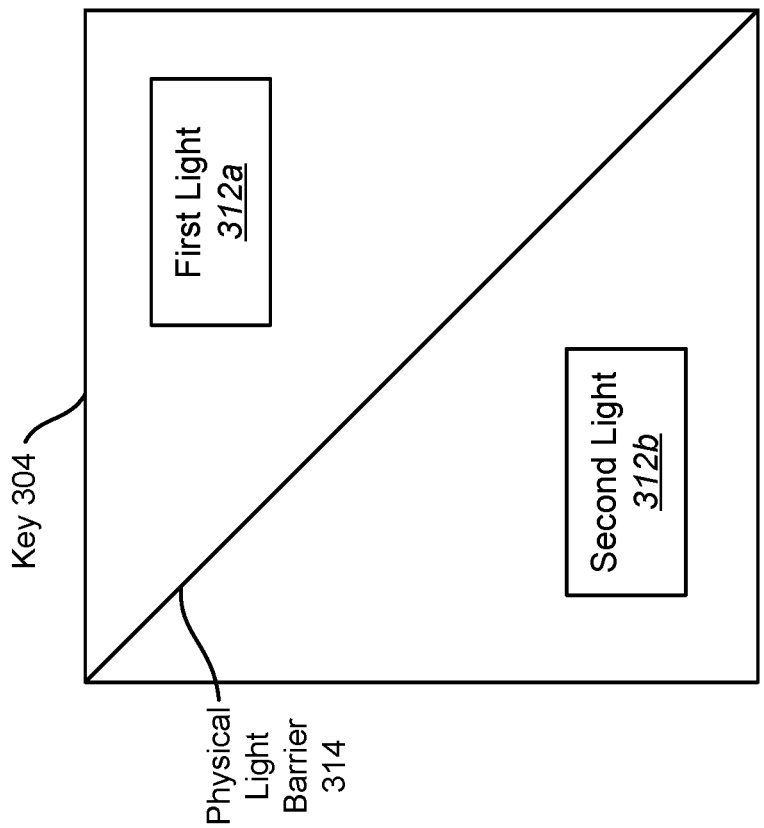

FIGS. 3A and 3B are examples illustrating light placement on a key 304 to indicate a selected OS mode. The key 304 may be implemented in accordance with the key 104 described in FIG. 1.

An interior view of the key 304 is depicted in FIG. 3A. The key 304 may include a first light 312a and a second light 312b. The lights 312a-b may be implemented as LEDs or other lighting technology. The first light 312a may be associated with a first OS mode and the second light 312b may be associated with a second OS mode. For example, when the first OS mode is selected, the first light 312a may be illuminated and the second light 312b may be turned off. When the second OS mode is selected, the second light 312b may be illuminated and the first light 312a may be turned off.

The placement of the lights 312a-b may indicate the selected OS mode. For example, the first light 312a may be located in the upper right region of the key 304. The second light 312b may be located in the lower left region of the key 304. Other keys (not shown) may have a consistent (e.g., the same) light placement to indicate their function for a selected OS mode. For example, the other keys may have lights associated with the first OS mode located in the upper right region and lights associated with the second OS mode located in the lower left region.

The lights 312a-b may have different colors to indicate the selected OS mode. For example, the first light 312a may be blue and the second light 312b may be green.

In some examples, the key 304 may include a physical light barrier 314. The physical light barrier 314 may be formed or positioned in the key 304 to prevent illumination from a light 312 from reaching the region of the other light 312. In other examples, the key 304 may not have a physical light barrier 314.

FIG. 3B illustrates an example of a keypad 305. A first symbol 316a may be located in the upper right region above the first light 312a. A second symbol 316b may be located in the lower left region above the second light 312b. Light may pass through the symbols 316a-b, but light may be blocked from passing through other areas of the keypad 305. The first light 312a may illuminate the first symbol 316a. The second light 312b may illuminate the second symbol 316b. The symbols 316a-b may be text (e.g., letter(s) and/or number(s)) or other visual information (e.g., the WINDOWS symbol). Some examples of symbols that may be used for switching between OS modes are described in FIG. 4

Figure 4:
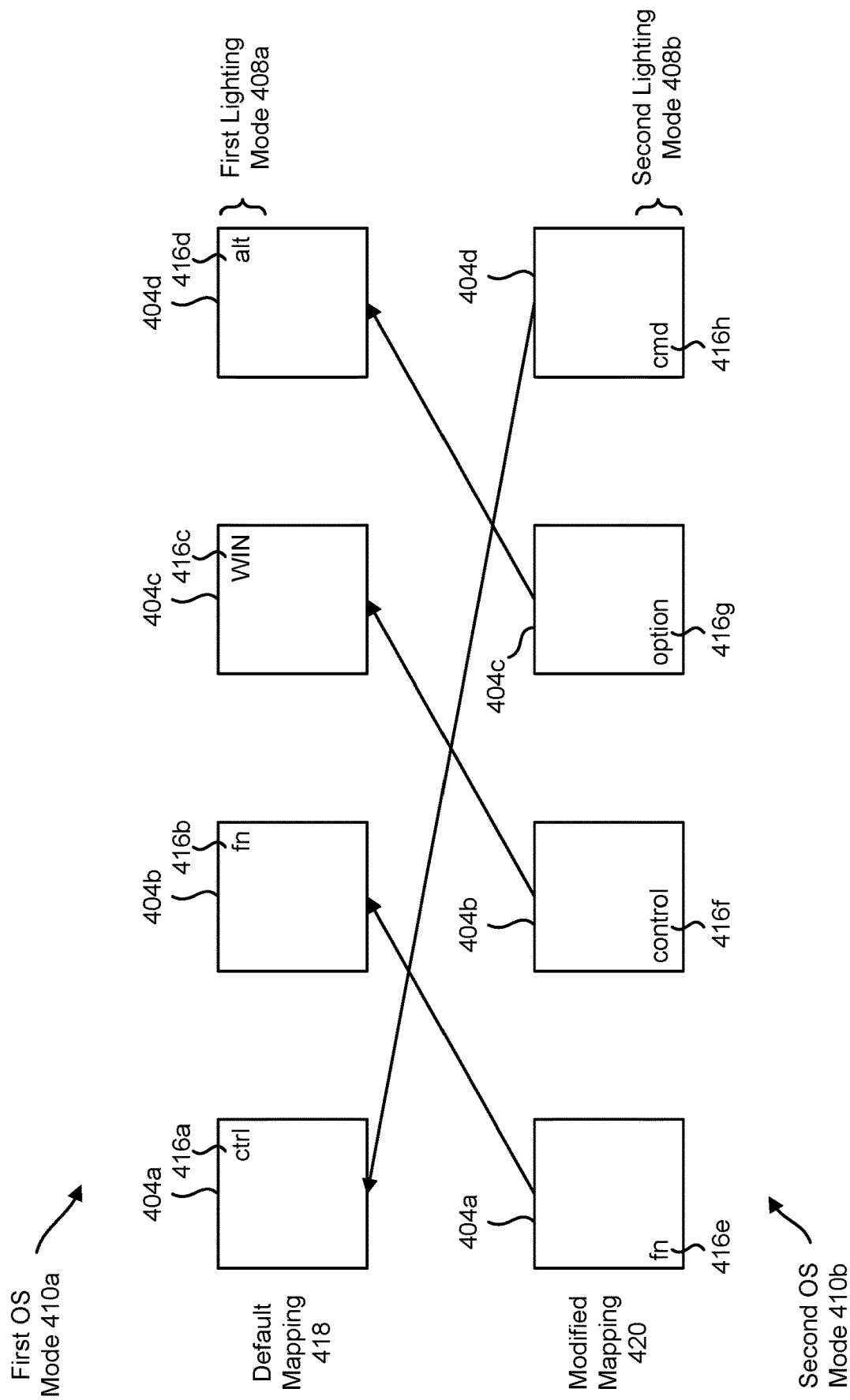
FIG. 4 illustrates examples of lighting modes and keyboard remapping for switching between OS modes.

FIG. 4 illustrates examples of lighting modes 408 and keyboard remapping for switching between OS modes. Four keys 410a-d are shown in a first OS mode 410a and a second OS mode 410b.

When the first OS mode 410a is selected, the symbols 416a-d of the keys 410a-d may be illuminated according to the first lighting mode 408a. Lights located in the upper right portion of keys 404a-d may be illuminated to indicate the function of the keys 404a-d when in the first OS mode 410a. In this example, the first OS mode 410a may be WINDOWS mode. A first key 404a may illuminate "ctrl" to indicate the control modifier, a second key 404b may illuminate "fn" to indicate the function modifier, a third key 404c may illuminate "win" to indicate the WINDOWS modifier, and a fourth key 404d may illuminate "alt" to indicate the alternate modifier. Each of the symbols 416a-d may be illuminated with the same color (e.g., blue) to indicate that the first OS mode 410a is selected.

When the second OS mode 410b is selected, the symbols 416e-h of the keys 410a-d may be illuminated according to the second lighting mode 408b. Lights located in the lower left portion of keys 404a-d may be illuminated to indicate the function of the keys 404a-d when in the second OS mode 410b. In this example, the second OS mode 410b may be MAC OS mode. The first key 404a may illuminate "fn" to indicate the function modifier, the second key 404b may illuminate "control" to indicate the control modifier, the third key 404c may illuminate "option" to indicate the option modifier, and the fourth key 404d may illuminate "cmd" to indicate the command modifier. Each of the symbols 416e-h may be illuminated with the same color (e.g., green) to indicate that the second OS mode 410b is selected.

The keyboard layout may be remapped based on the selected OS mode. For example, when in the first OS mode 410a, the keys 410a-d may have a default mapping 418. In the case of the first OS mode 410a being WINDOWS mode, the default mapping 418 may be the default WINDOWS keyboard layout.

When the second OS mode 410b is selected, the keys 410a-d may have a modified mapping 420. In other words, the function of the keys 410a-d may change from the default of the second OS when the second OS mode is selected. An example of the modified mapping 420 is indicated by the arrows in FIG. 4.

For a modified mapping 420 in the case of the second OS mode 410b being MAC OS mode, the keys 410a-d may implement the corresponding WINDOWS function as indicated by the arrows. For example, key 404a (e.g., the "fn" key in MAC OS) may be mapped to the function modifier of WINDOWS. Key 404b (e.g., the "control" key in MAC OS) may be mapped to the WINDOWS modifier of WINDOWS. Key 404c (e.g., the "option" key in MAC OS) may be mapped to the alt modifier of WINDOWS. Key 404d (e.g., the "command" key in MAC OS) may be mapped to the control modifier of WINDOWS. In this example, when a user presses key 404d when in the second OS mode 410b (e.g., MAC OS mode), the control modifier (i.e., ctrl) of WINDOWS is performed.

Figure 5:
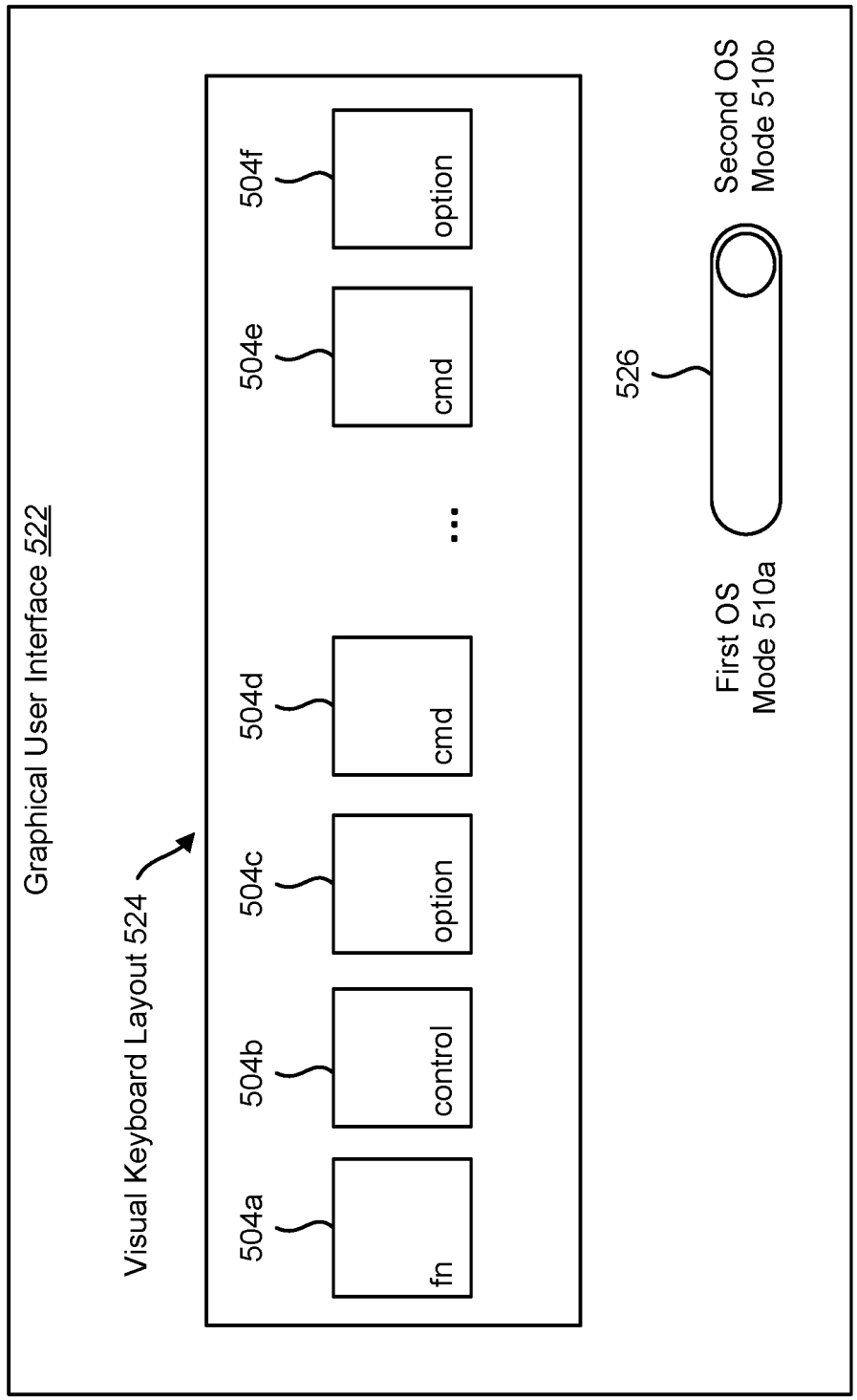
FIG. 5 is an example of a graphical user interface (GUI) to toggle between OS modes.

FIG. 5 is an example of a graphical user interface (GUI) 522 to toggle between OS modes 510a. The GUI 522 may be implemented by a computing device in communication with a keyboard device.

The GUI 522 may include a user interface (UI) element 526 to select between a first OS mode 510a and a second OS mode 510b. In an example, the UI element 526 may be a toggle. In other examples, the UI element 526 may be a button, slider, knob or other mechanism to select either the first OS mode 510a or the second OS mode 510b. The computing device may cause the keyboard device to switch between lighting modes based on the selected OS mode as described in FIG. 1. The computing device may also remap the keyboard based on the selected OS mode as described in FIG. 4.

The GUI 522 may include a visual keyboard layout 524. A visual representation of keys 504a-f may be displayed in the keyboard layout 524. The visual representation of the keys 504a-f may change based on the selected OS mode. The visual representation of keys 504a-f may indicate the function of the corresponding keys on the physical keyboard device for the selected OS mode.

In this example, the second OS mode 510b is selected by the UI element 526. The second OS mode 510b may be MAC OS mode. In this case, the visual keyboard layout 524 may display the symbols (e.g., key labels) associated with the keys 504a-f. When the first OS mode 510a (e.g., WINDOWS mode) is selected, the symbols on the keys 504a-f in the visual keyboard layout 524 may change to reflect the functionality of the keys 504a-f in the first OS mode 510a.

The invention claimed is:

1. A keyboard device, comprising:
a first key comprising a first lighting element that switches between lighting modes based on a selected operating system (OS) mode to indicate the selected OS mode; and
a second key comprising a second lighting element that switches between the lighting modes based on the selected OS mode;
wherein functionality of the first key and the second key are remapped to change the functionality of the keyboard device based on the selected OS mode;
wherein, in a first key mapping, the first key and the second key are associated with functions of a basic input/output system (BIOS);
wherein, in a second key mapping, the first key and the second key are associated with functions of a first OS;
wherein, in a third key mapping, the first key and the second key are associated with functions of a second OS;
wherein the keyboard device is to use the first key mapping, the second key mapping, or the third key mapping based on the selected OS mode;
wherein the keyboard device transmits information corresponding to a first function of the BIOS, a first function of the first OS, or a first function of the second OS responsive to a key press of the first key;
wherein the keyboard device transmits information corresponding to a second function of the BIOS, a second function of the first OS, or a second function of the second OS responsive to a key press of the second key;
wherein, in the first key mapping, the first key is illuminated in a manner that corresponds to the first function of the BIOS and the second key is illuminated in a manner that corresponds to the second function of the BIOS;
wherein, in the second key mapping, the first key is illuminated in a manner that corresponds to the first function of the first OS and the second key is illuminated in a manner that corresponds to the second function of the first OS;
wherein, in the third key mapping, the first key is illuminated in a manner that corresponds to the first function of the second OS and the second key is illuminated in a manner that corresponds to the second function of the second OS;
wherein the first function of the first OS, the second function of the second OS; and the first function or the second function of the BIOS are substantially the same function.

2. The keyboard device of claim 1, wherein the first lighting element comprises two lights.

3. The keyboard device of claim 2, wherein a first light illuminates in response to a first selected OS mode and a second light illuminates in response to a second selected OS mode.

4. The keyboard device of claim 2, wherein the two lights are separated by a physical light barrier which bisects the first key from one corner to an opposite corner.

5. The keyboard device of claim 4, wherein a top right corner or a bottom left corner of the first key is illuminated to indicate the selected OS mode.

6. The keyboard device of claim 1, where in the first lighting element comprises a light placement indicating the selected OS mode.

7. The keyboard device of claim 1, wherein different portions of the first key illuminate during a different OS mode to indicate the selected OS mode.

8. The keyboard device of claim 1, wherein different light colors of the first lighting element indicate the selected OS mode.

9. A computing device, comprising:
a user interface to toggle between operating system (OS) modes;
a first key comprising a first lighting element that switches between lighting modes based on a selected OS mode to indicate the selected OS mode;
a second key comprising a second lighting element that switches between lighting modes based on the selected OS mode;
wherein functionality of the first key and the second key are remapped to change the functionality of the computing device based on the selected OS mode;
wherein, in a first key mapping, the first key and the second key are associated with functions of a basic input/output system (BIOS);
wherein, in a second key mapping, the first key and the second key are associated with functions of a first OS;
wherein, in a third key mapping, the first key and the second key are associated with functions of a second OS;
wherein the computing device is to use the first key mapping, the second key mapping, or the third key mapping based on the selected OS mode;
wherein the computing device transmits information corresponding to a first function of the BIOS, a first function of the first OS, or a first function of the second OS responsive to a key press of the first key;
wherein the computing device transmits information corresponding to a second function of the BIOS, a second function of the first OS, or a second function of the second OS responsive to a key press of the second key;
wherein, in the first key mapping, the first key is illuminated in a manner that corresponds to the first function of the BIOS and the second key is illuminated in a manner that corresponds to the second function of the BIOS;
wherein, in the second key mapping, the first key is illuminated in a manner that corresponds to the first function of the first OS and the second key is illuminated in a manner that corresponds to the second function of the first OS;
wherein, in the third key mapping, the first key is illuminated in a manner that corresponds to the first function of the second OS and the second key is illuminated in a manner that corresponds to the second function of the second OS;
wherein the first function of the first OS, the second function of the second OS, and the first function or the second function of the BIOS are substantially the same function.

10. The computing device of claim 9, wherein the OS mode corresponds to a key mapping associated with an operating system.

11. The computing device of claim 9, wherein the first key is remapped from a default mapping of a first operating system to a modified mapping of a second operating system in response to switching between OS modes.

12. The computing device of claim 9, wherein the lighting mode switches to indicate a mapping of the first key based on the selected OS mode.

13. The computing device of claim 9, wherein the first key is a modifier key of the computing device.

14. The computing device of claim 9, wherein the first lighting element illuminates a first symbol of the first key for a first OS mode and the first lighting element illuminates a second symbol of the first key for a second OS mode.

15. A method, comprising:
selecting an operating system (OS) mode of a computing device;
switching lighting modes of a first key comprising a first lighting element based on the selected OS mode to indicate the selected OS mode;
switching lighting modes of a second key comprising a second lighting element based on the selected OS mode to indicate the selected OS mode; and
remapping a functionality of the first key and the second key to change the functionality of the computing device based on the selected OS mode;
wherein, in a first key mapping, the first key and the second key are associated with functions of a basic input/output system (BIOS);
wherein, in a second key mapping, the first key and the second key are associated with functions of a first OS;
wherein, in a third key mapping, the first key and the second key are associated with functions of a second OS;
wherein the computing device is to use the first key mapping, the second key mapping, or the third key mapping based on the selected OS mode;
wherein the computing device transmits information corresponding to a first function of the BIOS, a first function of the first OS, or a first function of the second OS responsive to a key press of the first key;
wherein the computing device transmits information corresponding to a second function of the BIOS, a second function of the first OS, or a second function of the second OS responsive to a key press of the second key;
wherein, in the first key mapping, the first key is illuminated in a manner that corresponds to the first function of the BIOS and the second key is illuminated in a manner that corresponds to the second function of the BIOS;
wherein, in the second key mapping, the first key is illuminated in a manner that corresponds to the first function of the first OS and the second key is illuminated in a manner that corresponds to the second function of the first OS;
wherein, in the third key mapping, the first key is illuminated in a manner that corresponds to the first function of the second OS and the second key is illuminated in a manner that corresponds to the second function of the second OS;
wherein the first function of the first OS, the second function of the second OS, and the first function or the second function of the BIOS are substantially the same function.

16. The method of claim 15, wherein selecting the OS mode of the computing device comprises toggling between two OS modes.

17. The method of claim 15, wherein switching lighting modes of the first key comprises illuminating a first symbol on the first key for a first OS mode and illuminating a second symbol of the first key for a second OS mode.

* * * * *